(12) United States Patent
Darling et al.

(10) Patent No.: US 7,638,217 B2
(45) Date of Patent: Dec. 29, 2009

(54) NON-CIRCULATING COOLANT PEM FUEL CELL POWER PLANT ASSEMBLY WITH LOW THERMAL MASS

(75) Inventors: Robert Darling, South Windsor, CT (US); Jeremy P. Meyers, Austin, TX (US); Ryan J. Balliet, Oakland, CA (US)

(73) Assignee: UTC Power Corp., South Windsor, CT (US)

( * ) Notice: Subject to any disclaimer, the term of this patent is extended or adjusted under 35 U.S.C. 154(b) by 535 days.

(21) Appl. No.: 11/604,411

(22) Filed: Nov. 28, 2006

(65) Prior Publication Data

US 2007/0072031 A1    Mar. 29, 2007

Related U.S. Application Data

(63) Continuation-in-part of application No. 11/027,332, filed on Dec. 29, 2004, now Pat. No. 7,504,170.

(60) Provisional application No. 60/787,401, filed on Mar. 30, 2006.

(51) Int. Cl.
  *H01M 8/04* (2006.01)
  *H01M 8/10* (2006.01)
(52) U.S. Cl. .............................. 429/13; 429/26; 429/30; 429/32
(58) Field of Classification Search .................... 429/13, 429/26, 30, 32, 38
See application file for complete search history.

(56) References Cited

U.S. PATENT DOCUMENTS

| 5,700,595 | A  | * | 12/1997 | Reiser  | 429/13 |
| 6,127,057 | A  | * | 10/2000 | Gorman  | 429/13 X |
| 2004/0170878 | A1 | * | 9/2004 | Goebel  | 429/26 |

* cited by examiner

*Primary Examiner*—Stephen J. Kalafut
(74) *Attorney, Agent, or Firm*—William W. Jones

(57) ABSTRACT

A PEM fuel cell power plant includes fuel cells, each of which has a cathode reactant flow field plate which is substantially impermeable to fluids, a water coolant source, and a fluid permeable anode reactant flow field plate adjacent to said water coolant source. The anode reactant flow field plates pass water from the coolant sources into the cells where the water is evaporated to cool the cells. The cathode flow field plates prevent reactant crossover between adjacent cells. By providing a single water permeable plate for each cell in the power plant the amount of water present in the power plant at shut down is limited to a degree which does not require adjunct water purging components to remove water from the plates when the power plant is shut down during freezing ambient conditions. Thus the amount of residual ice in the power plant that forms in the plates during shut down in such freezing conditions will be limited. The power plant can thus be restarted and brought up to full operating power levels quickly due to the reduced amount of ice that must be melted during startup. The power plant is thus well suited for use in powering vehicles.

17 Claims, 1 Drawing Sheet

NON-CIRCULATING COOLANT PEM FUEL CELL POWER PLANT ASSEMBLY WITH LOW THERMAL MASS

This application claims the benefit of U.S. Ser. No. 60/787,401, filed Mar. 30, 2006. This application is also a continuation-in-part of U.S. Ser. No. 11/027,332, filed Dec. 29, 2004, now U.S. Pat. No. 7,504,170.

TECHNICAL FIELD

The present disclosure relates to a polymer electrolyte membrane (PEM) fuel cell power plant which is cooled evaporatively by a water coolant. More particularly, this disclosure relates to a PEM fuel cell power source which can be relatively quickly restarted at freezing or near-freezing temperatures.

BACKGROUND

Polymer electrolyte membrane fuel cell assemblies are relatively low temperature low operating pressure fuel cell assemblies that utilize a catalyzed polymer membrane electrolyte to process air and a hydrogen-rich fuel, or pure hydrogen, to produce electricity and water. PEM fuel cells are well suited for use in mobile applications such as automobiles, buses, and the like, because they are relatively compact, light in weight and can operate at essentially ambient pressure. They also have utility in stationary applications. The membrane in fuel cells of this type must be kept moist during operation of the fuel cells lest they dry out, and they also require that excess product water formed during the reaction be removed from the cells lest they flood.

One type of fuel cell system which uses solid reactant flow field plates with integral reactant flow field plates can be cooled by spraying water droplets into the reactant flow streams before they enter the cells. The resultant moisture in the reactant streams will evaporate in the cells and will thus cool the cells during operation of the power plant. The reactant streams will also sweep out product water from the cells so as to protect them from flooding. This cooling and water removal approach requires the inclusion of adjunct equipment for spraying the water droplets into the reactant streams, and also involves the inclusion of water impermeable reactant fluid flow plates on both the anode and cathode sides of the fuel cells so as to ensure that product water will be swept out of the cells by the exiting reactant fluid flow streams. This type of system also requires relatively high pressure drops to maintain the gas phase velocities required to entrain liquid water droplets in the flow. These high pressure drops in turn increase parasitic loads and lower system efficiency. Furthermore, imprecise control over local humidity levels can subject the membrane to mechanical stress and accelerate membrane failure. This type of system is typically purged of water during shutdown in freezing ambient conditions by purging the system with a dry gas until a substantial portion of the water remaining in the system has been evaporated and removed from the system. This method of preventing the formation of ice in the system during freezing conditions is not satisfactory since it results in a substantial dry out of the membrane which severely limits performance of the cells on subsequent start, until the membrane is hydrated. Repeated use of this solution to the freeze problem will ultimately result in membrane degradation over time, because the membrane will degrade with humidity cycling.

Alternatively, this type of fuel cell system can utilize two porous plates. In this configuration, the porous anode and cathode separator plates serve to humidify the reactants, and the porous cathode plate removes product water from the electrochemical reaction. Under freezing conditions, when utilizing porous cathode and anode reactant flow field plates, the plates will not be purged of water, thus the water in the plates will freeze in situ after shutdown of the system. This eliminates the need for a long, energy-intensive purge and eliminates forced membrane humidity cycles which can deteriorate the membrane. Additionally, with a system using two porous plates, the internal resistance of the cells on restart is relatively low, meaning that high power can be drawn from the cells immediately upon restart. The disadvantage with this type of system is that it is designed to work with two porous plates in each cell in the stack, both of which contain frozen water upon restart, and therefore, it requires significant time and energy to thaw the ice in both plates. During the time when the internal cell water (ice) is thawing, there is no efficient way for removing product water from its point of generation in the cathode catalyst layer. The accumulation of water in the cathode catalyst layer and the adjacent gas diffusion layers will restrict gas access and thus reduce the maximum rate of power generation until the ice is thawed and a means of water removal is reestablished. Once the ice thaws and the temperature of the cells climbs, full power can then be rapidly achieved.

One solution to the problem of large thermal mass (ice) in the cells during freezing shutdown involves evacuating the porous plates when the power plant is shut down so that water in the plates and the coolant channels in the plates will be sucked out of them and thus no ice will form in the plates during shut down under freezing conditions. This is not a satisfactory solution to the problem, as it requires adjunct equipment to create the shut down vacuum in the power plant and it also provides no way for isolating reactant gases during shut down until the plates are refilled with water.

It would be highly desirable to have a solution to the problem which would have the advantages of the porous plate system but with much lower thermal mass and no reactant gas crossover during operation or shutdown.

DETAILED DISCLOSURE

This disclosure relates to an improved fuel cell power plant which is particularly useful for powering vehicles. The fuel cell power plant is a PEM cell power plant which operates at relatively low operating temperatures and at reactant pressures which are at or above ambient pressure. The power plant of this disclosure is cooled by evaporation of a water coolant in the cells of the power plant. The cells as disclosed are evaporatively cooled by water supplied in passageways. The passageways may comprise a material having in-plane (that is, parallel to the gas flow) permeability to water. The passageways can be adjacent to or within a first surface of the porous reactant gas flow field separators (plates) that have reactant gas flow channels opening at opposite surfaces of the flow field plate. Each passageway can be in fluid compaction with a water reservoir which may receive condensate from the cathode exhaust.

The water supply to the passageways may be further enhanced by a vacuum pump or the like. The pump provides a pressure in the portions of the passageways of the stack to assure that the water level in the stack will reach all parts of the passageways in the stack. Water passes from the passageways or permeable material through the flow field separator perpendicular to the plane thereof. This is in contrast to prior art wicking configurations that conduct water in parallel with the plane of the fuel cells.

The water travels only a very short distance from the water passageways or permeable material through porous material to the surface of the reactant channels where the water evaporates. The short distance can be less than 0.5 millimeters.

The water in the cell stack can be managed for evaporative cooling separately from the pressure drop across the reactant gas flow path into which the water will migrate. The individual fuel cells can be thinner than those of comparable performance cell stacks.

A condenser can be employed and utilize uncontrolled ambient air to cool the cathode exhaust. The amount of air may possibly be controlled in relation to the air exhaust temperature from the cell stack.

A second liquid-impermeable reactant flow field separator (plate) is included in the cell stack. Preferably, but not necessarily, the permeable plate will be the anode reactant plate, and the impermeable plate will be the cathode reactant plate. With this preferred embodiment, we achieve good thermal management while at the same time, by providing humidification on the anode side of the cells, we achieve ample membrane humidification which results in improved membrane durability.

The power plant of this disclosure can be operated at freezing ambient temperatures and can be relatively quickly started in such freezing ambient conditions. Startup is facilitated by limiting the amount of water which will freeze inside of the power plant during shut down in an ambient freezing environment.

BRIEF DESCRIPTION OF THE DRAWING

Various objects and advantages of this disclosure will become more readily apparent to one skilled in the art from the following detailed description of a preferred embodiment of the disclosure when taken in conjunction with the accompanying drawing in which.

SPECIFIC MODE FOR CARRYING OUT THE DISCLOSURE

Figure 1:
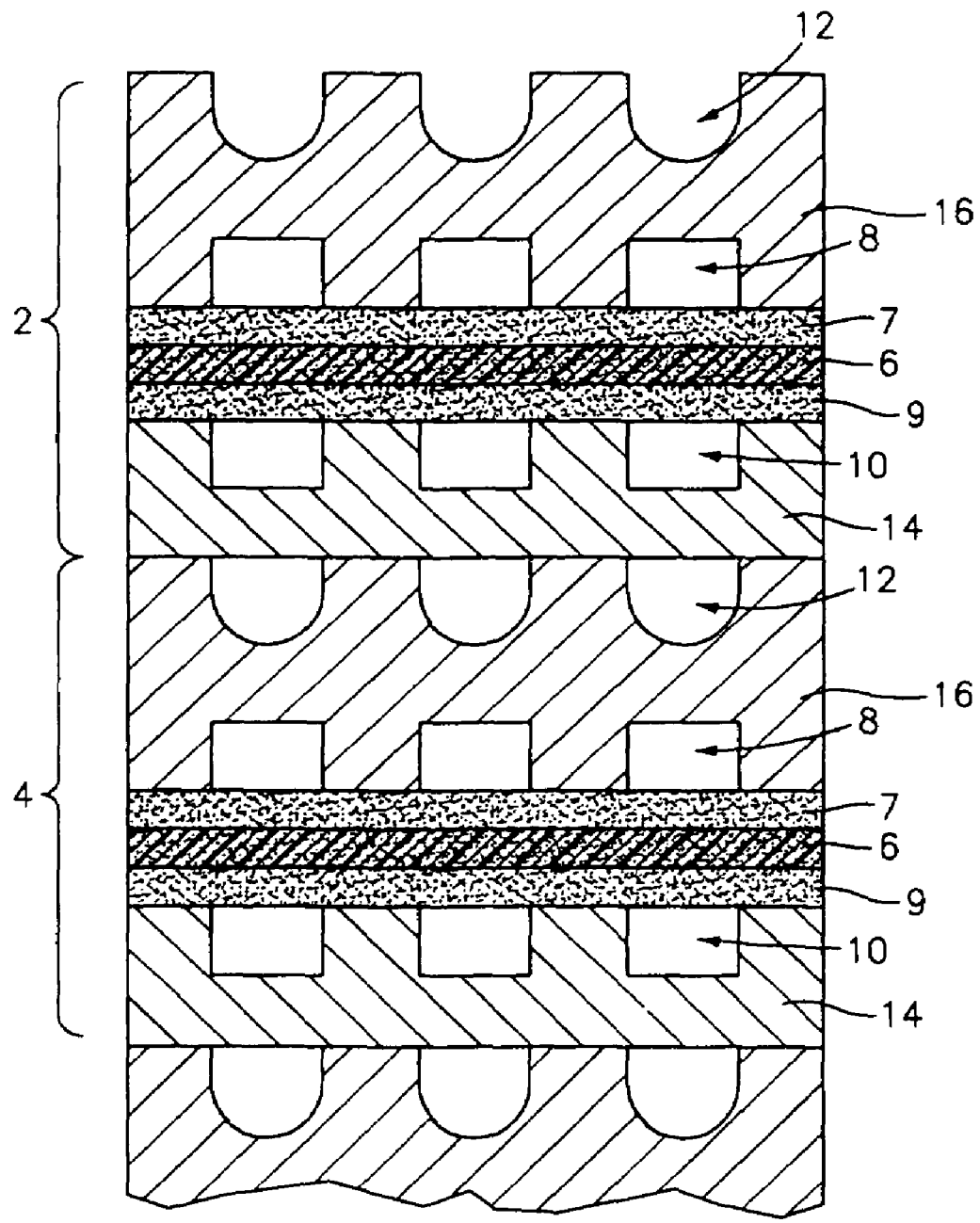
FIG. 1 is a cross sectional view of two adjacent fuel cell assemblies in a fuel cell power plant.

Referring now to the drawing, FIG. 1 is a schematic sectional view of two adjacent fuel cells 2 and 4 in a PEM cell power plant formed in accordance with this disclosure. The fuel cells 2 and 4 each include a catalyzed polymer electrolyte membrane (i.e., membrane electrode assembly (MEA)) 6 which is interposed between a fuel reactant flow field 10 (the anode side) formed in plates 14 and an oxidant reactant flow field 8 (the cathode side) formed in plates (i.e., separators) 16. Porous gas diffusion layers 7 and 9 are disposed on either side of the membrane 6 so as to evenly distribute the fuel and air reactants to the membrane 6 during operation of the power plant. Coolant passages 12 are preferably formed in the plates 16 and are disposed adjacent to the anode side 10 of the fuel cells 2 and 4. It will be understood that the passages 12 could be formed in separate plates in the assembly, or could be formed in the portion of the plates 14 that face the plates 16, however, it is preferred to form the passages 12 in the plates 16 as shown in FIG. 1. The coolant passages 12 contain an aqueous coolant that serves to cool the PEM cell subassemblies 2 and 4 so as to maintain the proper operating temperature of the fuel cells 2 and 4. The cooling is preferably performed by means of coolant water passing from the passages 12 through the water permeable plates 14 which form the anode flow fields 10. The coolant water thus penetrates into the plates 14. During the reaction, the hydrogen in the fuel and the oxygen in the air are converted to electrons and product water. The water permeable plates 14 are operative to pass coolant water and/or water vapor into the anode flow fields 10. The coolant water moves through the gas diffusion layer 9, electrolyte membrane 6 assisted by proton movement drag of water and through the gas diffusion layer 7 into the cathode flow field 8 where water vapor is evaporated during operation of the power plant. Proton drag of water is a function of the flow of ionic current. The hydrogen is oxidized to H+ cation or protons and entrains several molecules of membrane water as water of hydration during the proton transport through the membrane 6. A proton can transport approximately 8-10 molecules of water. The plates 16 that form the cathode sides 8 of the fuel cells are substantially impermeable to fluids, particularly gases, i.e., have a less than ten percent void volume, so that neither water nor gases may penetrate them in a quantity that significantly increases the thermal mass nor compromises the gas barrier.

During operation of the power plant, the plates 14 contain water. Some of that water will evaporate so as to cool the cells during operation of the power plant. During normal steady state operation, water will continue to be supplied to the plates 14 at a rate which is equal to the evaporation rate, thus, the plates 14 will contain sufficient water to form a wet seal) i.e., a barrier to gas). When the power plant is shut down, the plates 14 will still contain water but the plates 16 will not contain any substantial amounts of water. If the power plant is operating in a freezing environment, such as in a vehicle in the winter, when shut down occurs, the water in the plates 14 can and will freeze. Thus when the power plant is restarted in such an environment, the ice in the plates 14 must be melted before full power operation can be achieved. This melting of the residual water will take place by waste heat generated during the startup procedure of the power plant without the need of any adjunct components in the system to accomplish the melting process. Melting of the frozen water in the assembly of this disclosure will require about 40-60% less energy than melting of frozen water in the two porous plate systems.

We have determined that by employing only one water permeable reactant flow field plate in each cell in an evaporatively cooled PEM cell power plant, we can provide sufficient water from the coolant flow fields to properly cool the power plant to an appropriate operating temperature through evaporation of the coolant water in the cells. The coolant water moves through the water permeable reactant flow field plates toward the membrane in each cell. By having only one water permeable plate for each cell in the power plant, we can limit the amount of water in the power plant at shut down and thus limit the amount of ice that may form in the power plant when the latter is shut down under ambient freezing conditions. This enables us to restart the power plant under or after such freezing conditions and bring the power plant up to fully operational power levels sooner. This is due to the reduced amount of ice that can form in the power plant. Our system does not need any adjunct components to purge the permeable plates of water. It will be appreciated that during shut down periods at ambient freezing or nonfreezing temperatures, there will be no reactant gas cross over from one cell to another since the water permeable reactant flow field plate will contain sufficient quantities of water or ice to form a seal, and thus be impermeable to gases, and the other reactant flow field plate in each cell will be impermeable to gases while containing negligible quantities of water. Preferably, the anode reactant flow field plate will be the liquid permeable plate in each cell.

Since many changes and variations of the disclosed embodiment of the disclosure may be made without departing from the inventive concept, it is not intended to limit the disclosure otherwise than as required by the appended claims.

What is claimed is:

1. A PEM fuel cell power plant having a plurality of fuel cell assemblies, wherein each of said fuel cell assemblies comprises:
   a) a polymer electrolyte membrane member;
   b) a cathode reactant flow field plate adjacent to one side of said electrolyte membrane member, said cathode reactant flow field plate being substantially impermeable to liquids;
   c) an anode reactant flow field plate adjacent to an opposite side of said electrolyte membrane, said anode reactant flow field plate being permeable to liquids so that water can move through said anode reactant flow field plate; and
   d) coolant passages disposed adjacent to said anode reactant flow field plate, said coolant passages containing a water coolant which saturates said anode reactant flow field plate and is operative to evaporatively cool said fuel cell assemblies during operation thereof.

2. A PEM fuel cell assembly comprising:
   a) a polymer electrolyte membrane member;
   b) a cathode reactant flow field plate adjacent to one side of said electrolyte membrane member, said cathode reactant flow field plate being substantially impermeable to liquids;
   c) an anode reactant flow field plate adjacent to an opposite side of said electrolyte membrane, said anode reactant flow field plate being permeable to liquids so that water can move through said anode reactant flow field plate; and
   d) coolant passages adjacent to said anode reactant flow field plate, said coolant passages containing a water coolant which is operative to saturate said anode reactant flow field plate and is operative to evaporatively cool said fuel cell assembly during operation thereof.

3. A PEM fuel cell power plant having a plurality of fuel cell assemblies, wherein each of said fuel cell assemblies comprises:
   a) a polymer electrolyte membrane;
   b) a cathode reactant flow field plate adjacent to one side of said electrolyte membrane member, said cathode reactant flow field plate being substantially impermeable to liquids;
   c) an anode reactant flow field plate adjacent to an opposite side of said electrolyte membrane, said anode reactant flow field plate being permeable to liquids so that liquid coolants can move through said anode reactant flow field plate; and
   d) a coolant source adjacent to said anode reactant flow field plate, said coolant source containing a liquid coolant which is operative to cool said fuel cell assembly during operation thereof, wherein coolant from said coolant passage saturates and moves through said anode reactant flow field plate and through said electrolyte membrane to evaporate at said cathode flow field plate to evaporatively cool the fuel cell assemblies.

4. A PEM fuel cell power plant having a plurality of fuel cell assemblies, wherein each of said fuel cell assemblies comprises:
   a) a polymer electrolyte membrane member;
   b) a cathode reactant flow field plate adjacent to one side of said electrolyte membrane member, said cathode reactant flow field plate being substantially impermeable to liquids;
   c) an anode reactant flow field plate adjacent to an opposite side of said electrolyte membrane, said anode reactant flow field plate being permeable to liquids so that water can move through said anode reactant flow field plate; and
   d) a water coolant disposed adjacent to said anode reactant flow field plate, said water coolant being operative to saturate and move through said anode reactant flow field plate toward said electrolyte member so as to evaporatively cool said fuel cell assembly during operation thereof.

5. The power plant of claim 4 wherein said water coolant is disposed in coolant passages adjacent to said anode reactant flow field plate.

6. The power plant of claim 5 wherein said coolant passages are formed in a surface of said cathode reactant flow field plate.

7. In a fuel cell having a polymer electrolyte membrane, a fuel reactant flow field plate on an anode side of said membrane, an air reactant flow field plate on a cathode side of said membrane, one of said reactant flow field plates being permeable to liquids, and the other of said reactant flow field plates being substantially impermeable to liquids.

8. The fuel cell of claim 7 wherein one of said reactant flow field plates is said fuel reactant flow field plate.

9. The fuel cell of claim 8 further including a source of a liquid coolant operatively associated with said fuel reactant flow field plate, said fuel reactant flow field plate being saturated with coolant from said source thereof.

10. The fuel cell of claim 9 wherein said fuel cell is cooled by evaporation of said liquid coolant from said fuel reactant flow field plate.

11. The fuel cell of claim 10 wherein said source of said liquid coolant comprises coolant passages formed in said fuel reactant flow field plate.

12. The fuel cell of claim 11 wherein said liquid coolant is water.

13. The fuel cell of claim 12 further comprising porous gas distribution plates on opposite sides of said membrane, said gas distribution plates being permeable to water vapor so that water vapor can pass through said gas distribution plates from said fuel reactant flow field plate through said membrane to said air reactant flow field plate.

14. A method for limiting the thermal mass of ice in a PEM fuel cell power plant assembly during freezing temperature shut down of the fuel cell power plant assembly and preventing reactant gas cross over from one fuel cell to adjacent fuel cells in said power plant assembly, said method comprising:
   a) the step of preventing passage of a first reactant flow field plate by fluids;
   b) the step of allowing permeation of a second reactant flow field plate by an aqueous coolant; and
   c) the step of saturating only said second flow field plate with said aqueous coolant whereby only said second reactant flow field plate will be saturated with said aqueous coolant during shut down of said fuel cell assembly.

15. The method of claim 14 wherein said first reactant flow field plate is an air reactant flow field plate, and said second reactant flow field plate is a fuel reactant flow field plate.

16. A method for limiting the amount of an aqueous coolant in a PEM fuel cell assembly during shut down of the fuel cell assembly, said method comprising:
   a) the step of preventing permeation of a fluid impermeable cathode reactant flow field plate by said aqueous coolant;
   b) the step of allowing permeation of an anode reactant flow field plate by said aqueous coolant; and c) the step of providing a supply of said aqueous coolant adjacent to said anode reactant flow field plate for saturating said anode reactant flow field plate and evaporatively cooling said fuel cell assembly during operation thereof whereby residual aqueous coolant in the fuel cell assembly at shut down will only be present in said anode flow field plate and will not be present in said cathode flow field plate.

17. A method for preventing reactant gas cross over between adjacent fuel cells in a PEM fuel cell power plant assembly during operation and shut down of the power plant assembly, said method comprising the steps of:

a) providing a first reactant flow field plate in each of said fuel cells which is substantially impermeable to fluids;
b) providing a second reactant flow field plate in each of said fuel cells which is permeable to a liquid coolant;
c) flooding said second reactant flow field plate with a liquid coolant so as to render said second reactant flow field plate impermeable to gaseous reactants, whereby said first and second reactant flow field plates are operative to prevent reactant gas cross over between adjacent cells in said power plant assembly.

* * * * *